United States Patent [19]

Hansen et al.

[11] Patent Number: 4,639,976
[45] Date of Patent: Feb. 3, 1987

[54] METHOD AND A SYSTEM FOR PEELING CRUSTACEANS

[76] Inventors: Otto D. Hansen, Ostre Skovvej 21, DK-8240 Risskov; Bent K. Nielsen, Falkevej 45, DK-9352 Dybvad, both of Denmark

[21] Appl. No.: 527,577
[22] PCT Filed: Dec. 16, 1982
[86] PCT No.: PCT/DK82/00112
 § 371 Date: Aug. 16, 1983
 § 102(e) Date: Aug. 16, 1983
[87] PCT Pub. No.: WO83/02049
 PCT Pub. Date: Jun. 23, 1983

[30] Foreign Application Priority Data

Dec. 17, 1981 [DK] Denmark .............................. 5599/81

[51] Int. Cl.[4] .............................................. A22C 29/02
[52] U.S. Cl. .............................................. 17/48; 17/73
[58] Field of Search ...................... 17/48, 71, 73, 51, 45

[56] References Cited

U.S. PATENT DOCUMENTS 4,251,902  2/1981  Grinberg et al. .................. 17/48 X
4,307,492  12/1981 Braginsky et al. ................. 17/48 X
4,387,485  6/1983  Grinberg et al. .................. 17/51 X Primary Examiner—Willie G. Abercrombie
Attorney, Agent, or Firm—Antonelli, Terry & Wands

[57] ABSTRACT

For shelling crustaceans such as, for example, shrimps or krill, the preboiled crustaceans are reheated for a short period of time to a temperature at which the body liquid just inside the shells is slightly below the boiling temperature and, subsequently, the crustaceans are subjected to a sudden pressure drop such that the liquid just inside the shell boils up vividly. With the shells thus loosened, the crustaceans are caused to be moved rapidly against the surface of the water bath so that the loosened shells are drawn out of the bodies. The product in the water bath is separated and partly shelled crustaceans may be circulated for a renewed treatment. To carry out the shelling, a first receiver chamber or zone is provided with an arrangement for temporarily increasing the temperature and/or pressure of the received charge or flow of crustaceans. The first chamber or zone is openable toward a second chamber or zone in which the pressure is lower than in the first chamber or zone and which communicates with a third chamber or zone which accommodates a braking liquid. The crustaceans are moved rapidly against and into the brake liquid from the second chamber or zone.

9 Claims, 6 Drawing Figures

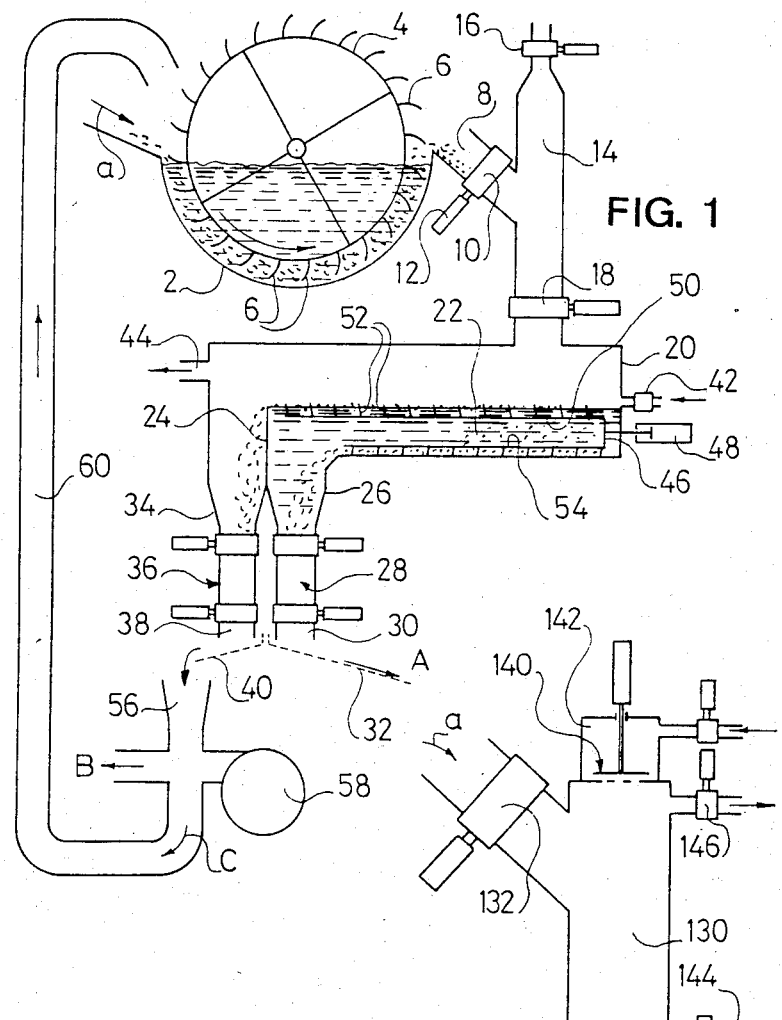
FIG. 1
FIG. 6
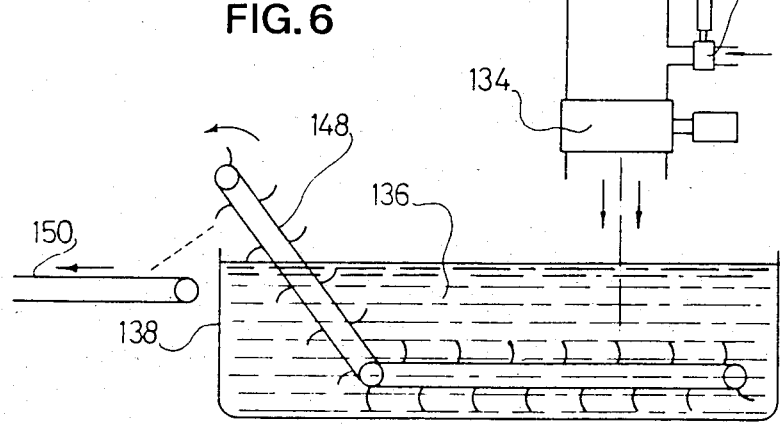

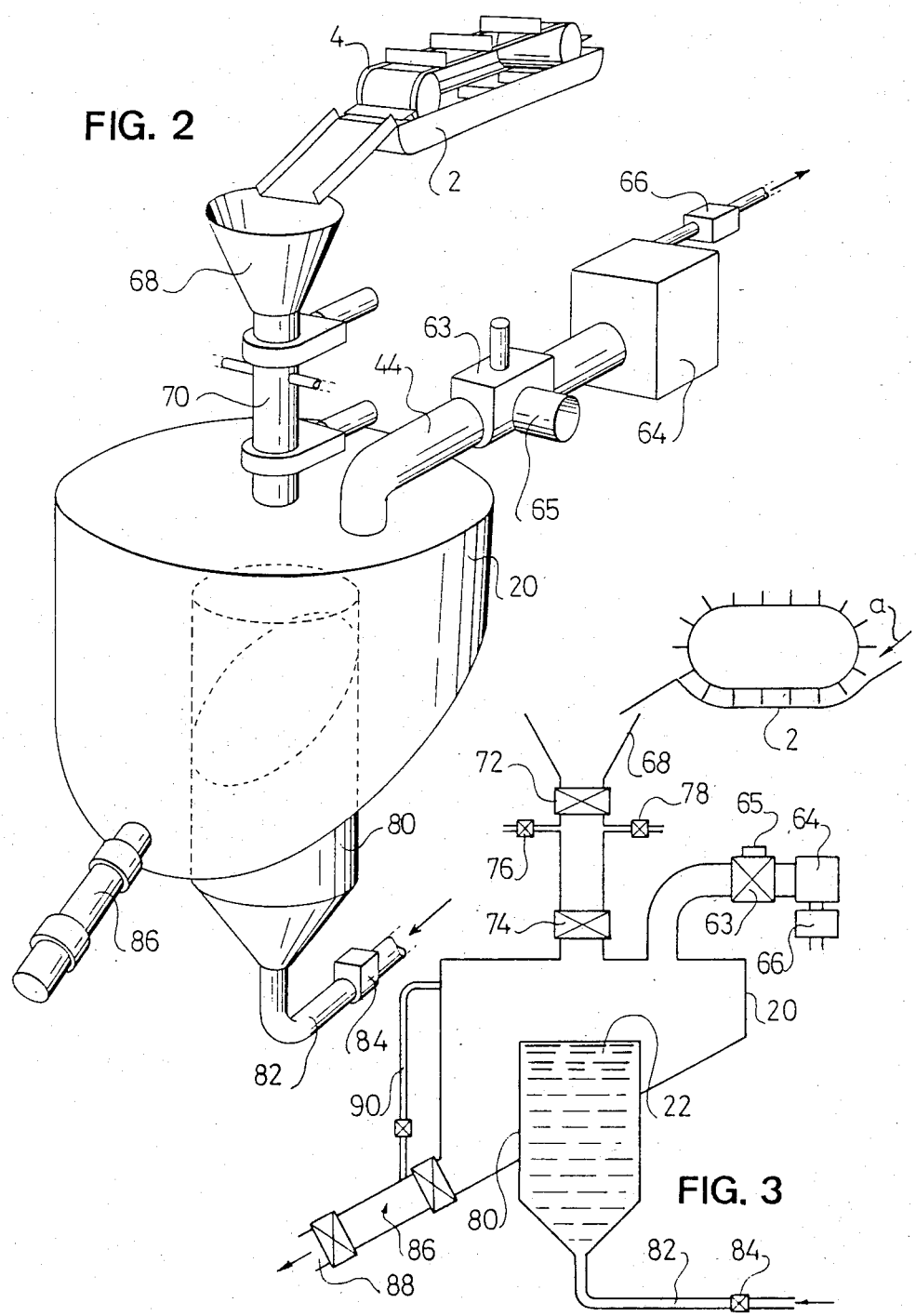

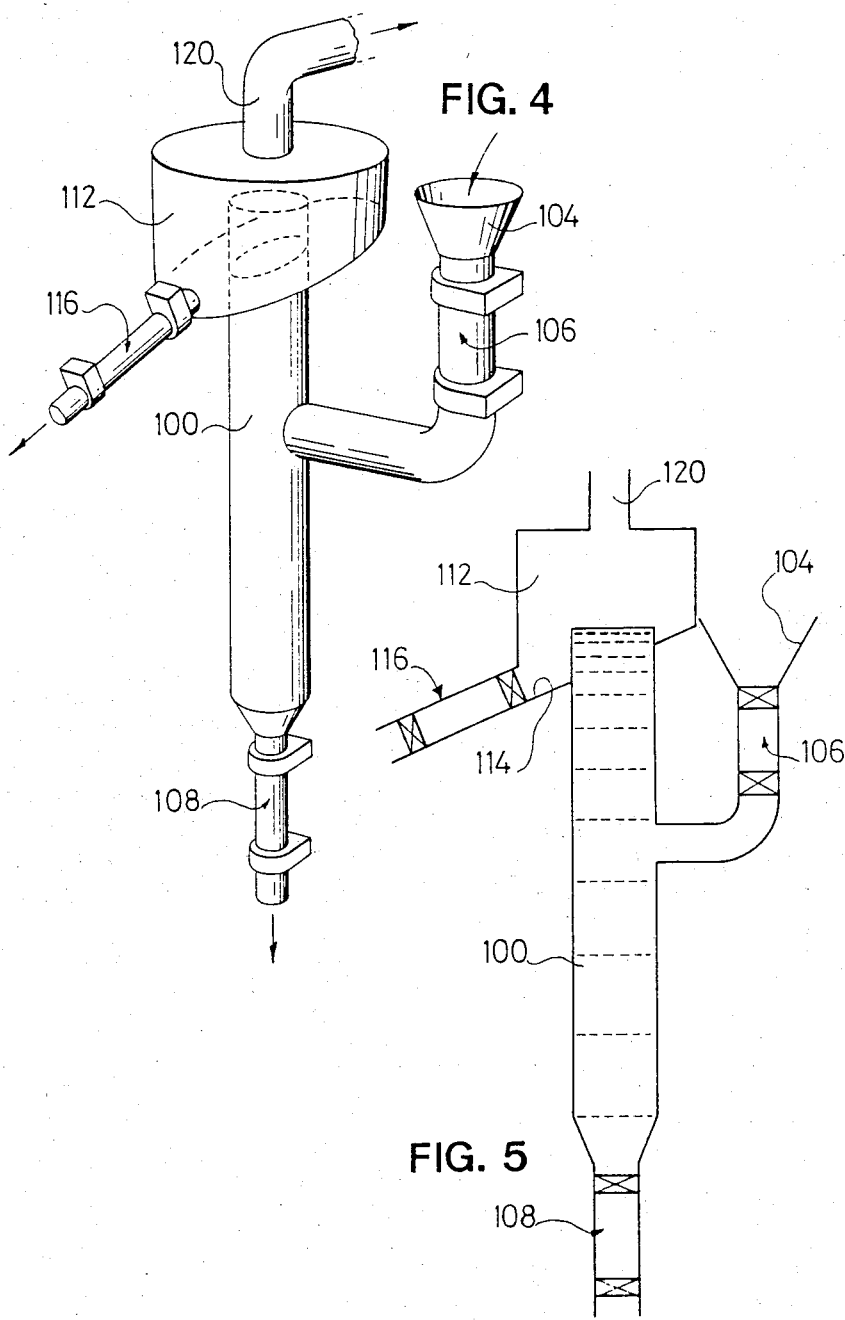

METHOD AND A SYSTEM FOR PEELING CRUSTACEANS

The present invention relates to a method and system for the removal of shells from crustaceans such as shrimp and so-called krill, i.e. small crustaceans forming an immense source of protein especially in the antarctic oceans.

Conventionally, crustaceans have been peeled or shelled by mechanical pressure rollers serving to crack the shells, but as well known this type of peeling is highly inefficient and requires a considerable amount of manual afterpeeling.

Several proposals have been made for improved peeling methods and systems, but withotu practical results. Thus, according to U.S. Pat. Nos. 2,798,334 and 3,812,271, it has been proposed to peel crabs by freezing the crabs and thereafter either expose the crabs to a pressure drop at a very high vacuum, and store the crabs at a high pressure for building up a high pressure inside the crabs, whereafter the pressure is suddenly relieved for causing the shell to explode, or to store in a pressurized explosive gas mixture, which diffuses into the crab portions inside of the shell, whereafter the gas is ignited upon the pressure being relieved, whereby the shells are removed by a combustion explosion. These methods are intricate, because of the said freezing, and as with the mechanical roller method these proposals show the disadvantage that a considerable and unavoidable portion of the product as processed, that is all the crustaceans which have been only partly shelled, must be manually shelled, because a repeated treatment of partly shelled crustaceans will be practically fruitless.

Another proposal is disclosed in U.S. Pat. Nos. 4,251,902 and DE-OS 3,000,072, wherein the crustaceans are subjected to a jet of a working liquid as injected into a moving stream of crustaceans, whereby the high velocity of the liquid jet along the crustaceans, prior to these being fully accelerated, account for a sub pressure created immediately about the crustaceans for a shell loosening affect. The accelerated crustaceans are caused to pass through a pipe section having a corrugated wall, which may engage the crustaceans frictionally and thus show some peeling effect on the already loosened shell portions. However, this applies only to the outermost crustaceans in the flow, and the efficiency of the method is relatively low. Again, manual afterpeeling is necessary, because a repeated treatment of the only partially peeled crustaceans is still less efficient, and the known proposal itself is silent in this respect.

The aim of the invention resides in providing an improved method of peeling crustaceans with a generally high efficiency and simplicity, based on a pressure difference treatment and a following mechanical treatment for separating the loosened shell portions from the body portions of the crustaceans, all in such a manner that the entire process is effective not only for whole crustaceans, but even for only partly shelled crustaceans, i.e. such that it may be possible to further process the partly-shelled crustaceans simply by a repeated treatment.

According to the invention the crustaceans, in preboiled condition, are exposed to a pressure drop from a pressure level at which the body liquid adjacent the surface of the bodies and just inside the shells exists in a liquid phase, to a lower pressure level, which is low enough to cause a boiling up of the said body liquid just inside the shells, whereafter the crustaceans for the mechanical treatment are caused to be rapidly moved against or into a brake liquid serving to frictionally engage the outside of the moving crustaceans thereby peeling or drawing off the already loosened shell portions thereof.

The pressure drop boiling of the liquid just inside the shells is a very simple expedient for loosening the shells reasonably effectively, and the rapid motion of the crustaceans into the brake liquid is not only a simple expedient, but a manner of ensuring that all the crustaceans are subjected to a rather effective, yet gentle surface friction resulting in a peeling action. The two expedients together, however, account for the very important possibility of repeating the treatment for crustaceans having been only partly peeled or shelled in the first instance. Thus, the pressure drop boiling is effective for shell loosening even if a major portion of the shell has already been removed, and, once the remaining shell has been repeatedly loosened, it almost cannot avoid frictional contact with the brake liquid, whereby in the second treatment it will be removed with a very high degree of probability. Therefore, because both of the method steps are well suited for renewed treatment of partly-shelled crustaceans, none of them need show any extreme efficiency, and they may thus be correspondingly simple.

Experiments have shown that by one treatment a considerably yield of totally shelled crustaceans in achievable and that by only one repeated treatment of the partly shelled crustaceans the total yield is so near 100% that a further repeated treatment may be unprofitable.

In the above-described method steps, the crustaceans are handled in a gentle manner, and it has been observed that the bodies of the ready processed crustaceans may be intact of such various fine details which are otherwise inevitably removed from the bodies in connection with conventional mechanical peeling.

Especially for enabling the repeated treatment of the only partly peeld crustaceans, it will be important in practice that the crustaceans are separated from the entirely peeled crustaceans and from the loose shells as already peeled off. It has been found that an efficient separation is achieveable by the brake liquid, when under subpressure, but even external separation may be utilized, as known per se in the art. However, it is still an aspect of the invention that the relevant separation may be effected in a very simple manner in a liquid under subpressure.

The invention also comprises a system for carrying out the discussed method, as more specifically defined in the appended claims.

In the following the invention is described in more detail with reference to the drawings, in which:

FIG. 1 is a schematic view of a system for removing shells from crustaceans constructed in accordance with the invention, FIG. 2 is a perspective view of a modified crustacean shell removing system of the present invention, FIG. 3 is a schematic side view of the system of FIG. 2, FIG. 4 is a perspective view of an external separator of the crustacean shell removing system of FIGS. 2 and 3, FIG. 5 is a schematic side view of the separator of FIG. 4, and FIG. 6 is a schematic side view of a further crustacean shell removing system according to the invention.

Referring now to the drawings wherein like reference numerals are used throughout the various views to designate like parts and, more particularly, to FIG. 1, according to this figure, a waterfilled half cylindrical inlet vat 2 has a rotor cylinder 4 with protruding shovels 6 rotating therein so as to scrape the shovels 6 along a bottom of the vat 2 from the left towards the right side thereof. Preboiled crustaceans are supplied to the vat 2 on a left side is a direction of an arrow a, and, by the action of the shovels 6, the crustaceans are moved through the vat 2 and are lifted off the vat 2 at the right hand side thereof for delivery to a downwardly directed channel 8, in which there is mounted a stop valve 10 actuated by a hydraulic or pneumatic cylinder 12.

The channel 8 merges into a vertical cylinder 14, with a top end of the vertical cylinder being closeable by a valve 16, and a bottom thereof being closeably by a valve 18. The bottom portion of the cylinder 14 is also connected to a tank 20 holding a water bath 22 partly confined by a low overflow end wall 24. Adjacent the wall 24 is arranged a outlet 26 from the bottom of the water bath 22, with the outlet 26 continuing in a sluice system 28 with associated sluice valves and with an outlet 30 just above an inclined screen chute 32. Adjacent the other side of the wall 24 is arranged an outlet 34, which is open upwardly toward the closed tank 20 and continues downwardly through a sluice system 36 to an outlet 38 just above another screen chute 40.

The tank 20 has a water inlet valve 42 and a pipe 44 connected to a vacuum source (not shown). A reciprocating scraper conveyor 46, is arranged in the water bath 22 with the scraper conveyor 46 being reciprocated by a working cylinder 48. The conveyor 46 has an upper portion 50 located so as to be operable to move goods floating on the surface of the water bath 22 towards the left and over the top edge of the end wall 24 by monolaterally pivotable lamellas 52, and a lower conveyor portion 54 correspondingly operable to move goods settled at the bottom towards the left and into the outlet 26.

In operation, e.g. for peeling shrimps, the shrimps are supplied to the vat 2 along the inlet arrow a, and are moved through the vat 22 by rotation of the cylinder 4. The vat 22 is heated, either for boiling the shrimps or, preferably for reheating preboiled shrimps during such short time that they are heated only on a surface thereof. The shrimps thus heated are delivered to the channel 8, and a predetermined charge of shrimps is filled into the cylinder 14 through the open valve 10, which is then closed, with the top and bottom valves 16 and 18 remaining closed. The top valve 16 is arranged between the cylinder 14 and the atmosphere or a source of compressed air (not shown).

Thereafter the valves 16, 18 are opened, and with a vacuum existing in the tank 20 the charge of shrimps will hereby be "fired" downwardly into this vacuum and rapidly accelerated toward the water bath 22 beneath the cylinder 14. The temperature and pressure conditions are adjusted such that a first result of the heated shrimps, being exposed to the lower pressure in the tank 20, is that a vivid boiling of the shrimp body liquid just inside the shrimp shells will occur, whereby the shells are effectively loosened from the bodies. A further result is that the shrimps, as conveyed by a powerful air flow from above, will be thrown into the water bath 22, and the water will act as a braking liquid frictionally decelerating the shrimps and thus peeling off the previously loosened shell portions due to the inertia of the moving shrimps.

By this treatment many of the shrimps will be totally peeled, while the remaining shrimps will only be partly peeled. Therefore, totally peeled shrimps, partly peeled shrimps and loose shell portions will be collected in the water bath 22, and it is of course necessary to thereafter carry out some relevant separation of these products in order to first of all recover the totally peeled shrimps.

Remarkably with the water bath 22 under vacuum, the shrimp products separate naturally, as the totally peeled shrimps sink to the bottom of the water bath 22, while both the loose shell portions and the partly peeled shrimps are collected along the surface of the water bath 22. Therefore, as the conveyor 46 operates, the lower conveyor portion 54 will move the totally peeled shrimps into the outlet 26, while the upper conveyor portion 50 will move both the free shell portions and the partly peeled shrimps over the wall 24 into the outlet 34.

Thus, through the sluice system 28, the totally peeled shrimps will be delivered to the screen chute 32, and, with the associated water drained off through the screen, the ready peeled shrimps will be delivered from the chute 32 in the direction of the arrow A.

Through the sluice system 36 the loose shell portions and the partly peeled shrimps together with excess water will be supplied to the screen chute 40, and, upon the water being drained off, the combined product is delivered to a hopper 56, from which it proceeds to an area which is transverely affected by an air flow as provided by a blower 58, whereby the loose shell portions are blown away through an outlet B, while the partly peeled shrimps pass the transverse air flow into an outlet C, from which they are recirculated to the inlet side of the vat 2 through a pipe 60. The pipe 60, of course, may be connected with suitable blower or other conveyor means for enabling the recirculation.

It will be understood that, upon the recirculation of the partly peeled shrimp, the shrimps will be subjected to a renewed heating in the vat 2 and a renewed pressure drop boiling of the body liquid inside the remaining shell portions. A surface liquid boiling will take place even on the already shelled portions of the body, but apparently this has no negative effect, and the result is a renewed loosening effect on the remaining shell portions. When the shirmps hit the braking liquid the remaining shell portions will be drawn off the bodies, agains without any adverse effects on the already shelled body portions. Thus, the treatment of the recirculated shrimp is gentle, yet still effective, and normally one or two recirculations will be sufficient to reduce the proportion of the partially shelled shrimps to a minimum.

The recirculation may take place in a continuous manner, i.e., concurrently with the treatment of the newly supplied, preboiled shrimps.

In the embodiment of FIGS. 2 and 3, the crustaceans are subjected to pressure drop boiling and shelling, and, more particularly, according to these figures, the vacuum tank 20 is connected through a pipe 44 to a vacuum source tank 64 fitted with a vacuum pump 66. The crustaceans are supplied in a direction of the arrow a to a heater vat 2 and are moved through the vat 2 by conveyor 4, which is speed adjustable to enable the preboiled and cooled crustaceans to be reheated at such short duration as required for raising the shell temperature to a desired level above the temperature of the interior body portions. The heated crustaceans are fed to a hopper 68 leading to a vacumm changer 70 through a valve 72. The chamber 70 is located above the top plate of the vacuum tank 20 for communication with the tank 20 through another valve 74. Furthermore the chamber 70 is connectable with a separate vacuum source (not shown) through a valve 76 and with a source of compressed air through a valve 78.

With the valves 74, 76 and 78 closed and the valve 72 open a charge of, for example, 1 kg crustaceans, is filled into the chamber 70, whereafter the valve 72 is closed. Then the valve 76 is opened for subjecting the chamber 70 to a vacuum, which is somewhat less than the vacuum in the tank 20, but sufficient to cause the rapid boiling of warmed body liquid just inside the shells of the crustacens. In a short time thereafter, of, for example, 10 seconds, the valve 76 is closed and the valves 74 and 78 are opened, whereby the charge of crustaceans is "fired" down into a water bath 22, accelerated by the air flow as generated by the increased vacuum in the tank 20 and the supply of compressed air through the valve 78.

Beneath the chamber 70, in or through the bottom of the tank 20, is arranged a vertical upwardly open cylinder 80, somewhat wider than the chamber 70 provided at a bottom thereof with a water supply pipe 82 including a valve 84. The cylinder 80 is completely filled with water, while the tank 20 is otherwise kept empty as described below. One purpose of the relatively narrow cylinder 80 is to assure that the crustaceans are "fired" down into a water surface which is as calm as possible since such calmness seems to promote the shelling action.

After the firing, a vacuum release valve 63 in the pipe 44 is actuated so as to vent the tank 20 to the atmosphere through a port 65, whereby all crustacean parts in the water move downwardly. However, immediately after the firing, the water supply valve 84 is opened so as to produce an upwardly directed water flow in the cylinder 80, whereby all crustacean parts in the water of the cylinder as well as the water itself will overflow the top edge of the cylinder 80 out into the surrounding tank 22. Hereby the various crustacean parts will fall to the bottom of the tank 20, while the water surface of the cylinder 80 will rapidly, for example, a few second, be cleaned for such parts and thus be prepared for calmly receiving a new "shot" of crustaceans from the chamber 70. The vacuum release valve 63 is switched over for creating a new vacuum in the tank 20.

The bottom of the tank 20 slopes toward an outlet sluice system 86, and the water and the crustacean parts in the tank 20 will thus naturally move towards the outlet sluice system 86, which continues in an outlet pipe 88, through which both the loose shell parts and the fully and the partly shelled crustaceans are discharged from the apparatus.

For a suitable operation of the outlet sluice 86 a pressure equalizing connection 90 is arranged between the outlet sluice and the vacuum tank 20, whereby the outlet sluice 86 may operate to maintain the tank 20 empty even when there is vacuum in the tank 20.

All of the desribed valves, of course, may be controlled automatically by a control unit (not shown) and the process of "firing" a charge of shortly prewarmed and pressure drop boiled crustaceans into the braking liquid of the cylinder 80 may be repeated.

The total outlet product delivered through the pipe 88, may be separated according to any suitable technique, primarily for removing all loose sorted shell parts and all fully shelled sorted crustaceans to further handling and packaging, and secondarily, but important enough for soring out all partly shelled crustaceans for repeated processing. A relevant sorter arrangement has been described already in connection with FIG. 1, but in practice it is preferred to make use of a separate separator device as illustrated, for example, in FIGS. 4 and 5, with the separator device operating in accordance with the principles described above in connection with FIG. 1.

The separator device shown in FIGS. 4 and 5 comprises a vertical cylinder 100 having a side inlet 102 connected with a receiver hopper 104 through an inlet sluice arrangement 106. A bottom of the cylinder 100 is provided with an outlet sluice system 108 and an outlet 110, and, at a top thereof the cylinder 100 projects into a closed top chamber 112 having a sloping bottom 114 communicating with an outlet sluice arrangement 116 and an associated outlet 118. A top of the closed top chamber 112, is provided with a pipe 120 connected to a vacuum source (not shown).

The product, as delivered from the outlet 88 of the a apparatus shown in FIGS. 2 and 3, is supplied to a conventional air separator (not shown), in which the loose shell portions are separated from the product, and the remaining product, including shelled and partly shelled crustaceans are then fed, in a flow of liquid, to the hopper 104 of the separator according to FIG. 3 and 4. The product is chargewise sluiced into the cylinder 100 through the sluice 106.

Because of the vacuum in the cylinder 100 the same type of separation as in the water bath 22 of FIG. 1 will now take place, that is, the shelled crustaceans will sink to the bottom and the partly shelled crustaceans will rise to the top end of the cylinder 100. By virtue of the admission of further water through the hopper 104 an overflow is created from the cylinder top, whereby the partly shelled crustaceans will enter the top chamber 112 and be sluiceable out through the outlet sluice arrangement 116 to the outlet 118. In its turn, the outlet 118 is connected to the inlet vat 2 of FIGS. 2 and 3, for the already discussed recirculation of the partly shelled crustacenas.

The shelled crustaceans are sluiced out through 108 to the bottom outlet 110 of the cylinder 100. Even this output may be recirculated, should the need arise.

It is emphasized that different types of crustaceans may separate invertedly in the cylinder, that is, for some types, the fully shelled bodies will rise to the top while the partly shelled bodies sink to the bottom. Furthermore, for a perfect separation it may be necessary to adjust the vacuum according to the character of the product.

Preferably the water in the cylinder 100 should be held at a temperature which is just below the boiling temperature of the water at the particular vacuum, whereby a certain bubble production will take place in the water, and the rising bubbles will promote an effective separation.

It will be appreciated that the separator of FIGS. 2 and 3 is advantageously applicable independently of the manner in which the crustaceans are otherwise treated for the shelling thereof.

As shown in FIG. 6 shelling system is provided wherein a pressure cylinder 130 is provided having an inlet valve 132 for crustaceans and a bottom outlet valve 134 located, for example, about 50 cm above a surface of an open water bath 136 in a vat 138. The cylinder 130 further has a top valve 140 for connecting the cylinder top to a compressed air chamber 142. Moreover, the cylinder 130 has a lower steam inlet valve 144 and an upper vent valve 146. A bottom conveyor 148 is disposed in the vat 138 for conveying precipitated products to a receiver such as a sorting conveyor 150.

When a charge of crustaceans has been filled into the cylinder 130, the inlet valve 132 is closed and the steam valve 144 and the vent valve 146 are opened. The vent valve 146 is closed when the steam fills out the cylinder 130, and thereafter, a steam pressure of some 2-4 atm is rapidly built up therein, with the steam having a temperature of about 120° C. A short time thereafter, such as, for example, after some 10 seconds, the steam valve 144 is closed, and the compressed air valve 140 is opened, whereby the pressure in the cylinder 130 may increase further. Shortly or immediately thereafter the bottom outlet valve 134 is opened, whereby the charge of crustaceans will be "fired" down into the water bath 136. As in FIG. 1 the crustaceans will be exposed to a sudden pressure drop, here down to ambient pressure and here in a preheated condition, such that the rapid boiling just inside the shells will take place, and rapidly thereafter they will hit the water bath 136 and get shelled thereby. Since the water bath is under ambient pressure it will not normally show any separator effect by flotation, and all parts of the product sink to the bottom, where they are conveyed by the conveyor 148 and brought to the sorter conveyor 150.

Hereafter some examples shall be given:

EXAMPLE 1

Shelling of fresh-caught North Sea shirmp

The shrimp are boiled in water of 100° C. for two minutes and are then cooled in running, cold water for complete cooling. Immediately prior to the shelling process the shrimp pass through the vat 2 in FIG. 3 with a passing time of about five second through water of 100° C., and a charge of about 1 kg is supplied to the chamber 70, of which the volume is about 4-5 liters. Then, the pressure in the chamber is lowered to a vacuum of about 500 mm Hg, and immediately thereafter the charge is fired into the tank 20 as holding a still lower pressure of a vacuum of about 700 mm Hg. The product in the bath 22 is sluiced out for external separation and for recirculation of partly shelled shrimp. Alternatively, the separation may be effected in the brake liquid under a vacuum (FIG. 1).

EXAMPLE 2

Shelling of frozen, thawed out, unboiled krill

Frozen krill in blocks are thawed out in running water for about three hours, and excess liquid is drained off, with the krill being thoroughly rinsed with cold water. Immediately prior to its being processed for shelling the krill is portionwise (1 kg) warmed for about fifteen second in water of 40° C. and is then supplied to the vacuum chamber 70 (FIG. 3) in which a vacuum of about 350 mm Hg is provided. From chamber 70 the krill is fired into the tank 20, in which the vacuum has been set to about 720 mm Hg. The combined product as delivered through the outlet 88 is supplied to an ordinary water flotation separator which separates the loose shells from the shelled and partly shelled krill, and the remaining krill product is fed to a vacuum separator according to FIG. 5, in which the fully shelled krill is separated from the partly shelled or unshelled krill at a water temperature of 20° C. and a vacuum of about 720 mm Hg.

EXAMPLE 3

Shelling of seaboiled, frozen Greenland shrimp

The loose frozen shrimp are thawed out in running water for about twenty minutes and are supplied to a steam heater 130, (FIG. 6). The shrimp are heated by steam of 3 atm (121° C.) for ten seconds, whereafter they are fired into a water bath at ambient pressure and temperature. The combined product is let out of the bath, and excess water is drained off from the product. The loose shells are separated away by air separation, and shelled and partly shelled shrimps and separated in the spearator of FIG. 5. The water temperature is preferably 25° C. and the vacuum is about 700 mm Hg. Partially shelled shrimp are recirculated to the steam heater.

We claim:

1. A method for removing shells from crustaceans, the method comprising the steps of subjecting the crustaceans to a pressure difference treatment for loosening the shells from body portions of the crustaceans and to a mechanical treatment for effectively separating the loosened shells from the body portions of the crustaceans, wherein the step of subjecting the crustaceans to a pressure difference includes exposing the crustaceans to a pressure drop from a pressure level, at which a body liquid adjacent a surface of the body portions and ajust inside the shells exists in a liquid phase, to a lower pressure level, which is low enough to cause a boiling of said body liquid just inside the shells, and rapidly moving the crustaceans for the mechanical treatment against or into a brake liquid serving to frictionally engage the outside of the crustaceans thereby peeling or drawing-off the already loosened shells thereof, and heating the crustaceans from the outside imemdiately prior to said pressure drop for a short duration such that the temperature of the body liquid just inside the shell is higher than a temperature of the body portion when the crustacean is subjected to said pressure drop.

2. A method according to claim 1, wherein the step of exposing the crustaceans to the pressure drop includes supplying the crustaceans to a first container which is openable to a second container accommodating said brake liquid, and wherein the step of rapidly moving the crustaceans against or into the brake liquid is effected by opening the first container upon a lower pressure level than having been established in the second container.

3. A method according to claim 1, further comprising the step of separating the crustacean only partially shelled by the mechanical treatment from fully shelled crustaceans by flotation in the brake liquid under a vacuum or in a separate liquid under vacuum and, thereafter, recirculating the partially shelled crustaceans for a renewed pressure drop treatment.

4. A system for removing shells from crustaceans, wherein the system comprises a first receiver chamber or zone provided with means for temporarily increasing at least one of a temperature and pressure of a received charge or flow of crustaceans, said first chamber or zone being openable towards a second chamber or zone, wherein the pressure is lower in the second chamber or zone than in the first chamber or zone, and wherein the second chamber or zone communicates with a third chamber or zone, accommodating a brake liquid, and means for effectively causing the crustaceans to be moved rapidly against or into said brake liquid from said second chamber or zone, and wherein said first chamber or zone is constituted by a heating means for heating the crustaceans from the outside for a short duration so that a temperature of a body liquid just inside the shell of the crustaceans is higher than a temperature of the body portion prior to subjecting the crustaceans to the lower pressure in the second chamber or zone.

5. A system according to claim 4, further comprising means for selectively separating loose shells from the brake liquid, entirely shelled crustaceans and partially shelled crustaceans, respectively, and means for recirculating the partially shelled crustaceans to said first chamber or zone.

6. A system according to claim 4, wherein said second and third chambers or zones are integrated as a single chamber, in which the brake liquid is contained under a pressure lower than the pressure in said first chamber or zone.

7. A system for removing shells from crustaceans, wherein the system comprises a first receiver chamber zone provided with means for temporarily increasing at least one of a temperature and pressure of the received charge or flow of crustaceans, said first chamber or zone being openable towards a second chamber or zone wherein the pressure is lower in the second chamber or zone than in the first chamber or zone, and wherein the second chamber or zone communicates with a third chamber or zone accommodating a brake liquid, and means for effectively causing the crustaceans to be moved rapidly against or into said brake liquid from said second chamber or zone, and wherein said first chamber or zone is constituted by a heater unit and the second chamber or zone is constituted at least partly by the vacuum chamber.

8. A system according to claim 7, wherein the vacuum chamber is openable towards a vacuum tank accommodating the brake liquid under vacuum in a narrow cylinder provided with a bottom fluid inlet, the vacuum tank outside the cylinder is provided with means for sluicing out the crustaceans overflowing the cylinder by admission of a fluid to the bottom thereof through said fluid inlet.

9. A separator for use in a system for removing shells from the crustaceans, wherein the system comprises a first receiver chamber or zone provided with means for temporarily increasing at least one of a temperature and pressure of the received charge or flow of crustaceans, said first chamber or zone being openable towards a second chamber or zone wherein the pressure is lower in the second chamber or zone than in the first chamber or zone, and wherein the second chamber or zone communicates with a third chamber or zone accommodating a brake liquid, and means for effectively causing the crustaceans to be moved rapidly against or into said brake liquid from said second chamber or zone, means for selectively separating loose shells from the brake liquid, entirely shelled crustaceans, and partially shelled crustaceans, respectively, and means for recirculating the partially shelled crustaceans to said first chamber or zone, the separator comprising a substantially vertically oriented cylinder having an inlet for the crustaceans to be separated in a liquid filled cylinder, a bottom outlet sluice for precipitated crustaceans, and a top end merging into a vacuum chamber having an outlet sluice for crustaceans overfloating the top end of the cylinder by an excess amount of liquid supply thereto, said vacuum chamber being conected with a vacuum source through a pipe.

* * * * *